United States Patent [19]

Weigle

[11] Patent Number: 4,721,185

[45] Date of Patent: Jan. 26, 1988

[54] OIL CONTAINER ARRANGEMENT FOR VEHICLES

[75] Inventor: Dieter Weigle, Ludwigsburg, Fed. Rep. of Germany

[73] Assignee: Robert Bosch GmbH, Stuttgart, Fed. Rep. of Germany

[21] Appl. No.: 856,771

[22] Filed: Apr. 24, 1986

[30] Foreign Application Priority Data

May 9, 1985 [DE] Fed. Rep. of Germany ....... 3516710

[51] Int. Cl.[4] .......................... F01M 9/10; F16H 5/04
[52] U.S. Cl. .................... 184/6.12; 184/6.24; 123/196 R; 60/453; 92/79; 74/467
[58] Field of Search ............................. 184/6.12, 6.24; 123/196 R, 196 A; 74/467; 60/453; 92/79

[56] References Cited

U.S. PATENT DOCUMENTS

| 4,392,463 | 7/1983 | Yasuhara | 123/196 R |
| 4,531,368 | 7/1985 | Killen | 60/453 |
| 4,531,485 | 7/1985 | Murther | 123/196 R |
| 4,648,363 | 3/1987 | Kronich | 123/196 A |

FOREIGN PATENT DOCUMENTS

| 166698 | 1/1986 | European Pat. Off. | 123/196 R |
| 2656223 | 6/1978 | Fed. Rep. of Germany | 123/196 R |

Primary Examiner—Carlton R. Croyle
Assistant Examiner—Jane E. Obee
Attorney, Agent, or Firm—Michael J. Striker

[57] ABSTRACT

A container arrangement for supplying with an oil a hydraulic system and a transmission of a vehicle, the arrangement comprises an element containing a supply of an oil to be used both for a hydraulic system and a transmission of the vehicle, a lubricant pump for supplying the oil to the transmission, a hydraulic pump for supplying the oil to the hydraulic system, and an additional container located above an oil level in the element so that the hydraulic pump aspirates always filtered oil from the additional container for the hydraulic system.

5 Claims, 1 Drawing Figure

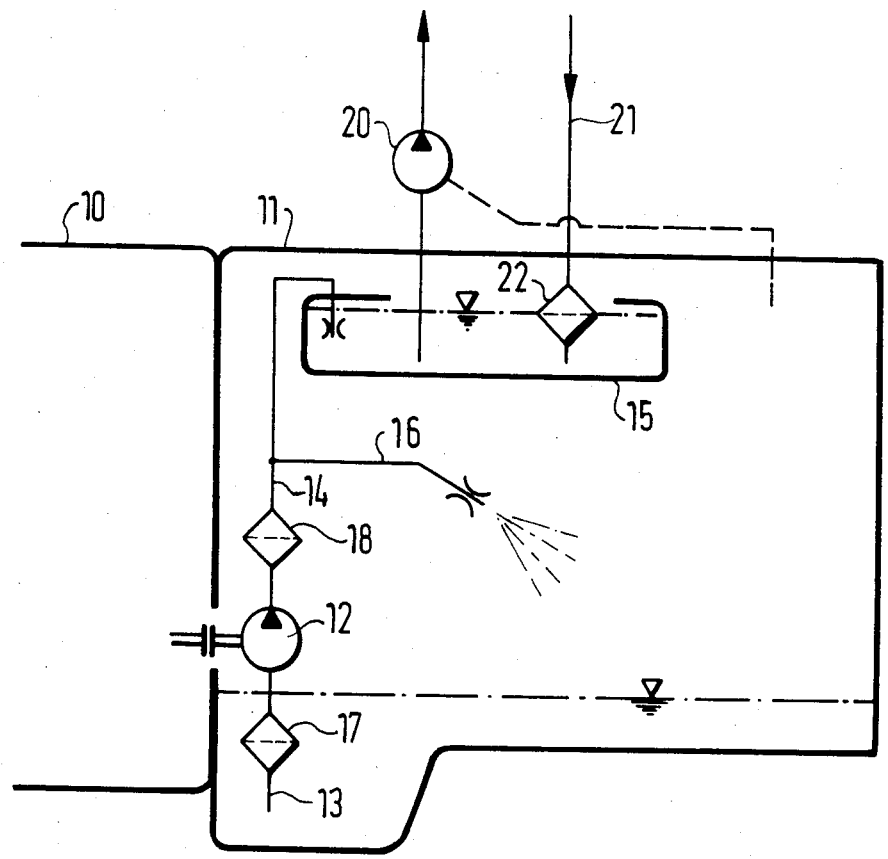

OIL CONTAINER ARRANGEMENT FOR VEHICLES

BACKGROUND OF THE INVENTION

The present invention relates to a container arrangement for vehicles with a joint oil supply for hydraulic system and a vehicle transmission.

Arrangements of the above mentioned general type are known in the art. A known arrangement has a lubricant pump and a hydraulic pump which supply oil from the joint oil supply to the vehicle transmission and to the hydraulic system, respectively. The known arrangements possess the disadvantage that both the lubricant pump for lubricating the vehicle transmission and the hydraulic pump for the hydraulic system of the vehicle aspirate oil from the same container. As a result of this, the contaminated oil, which contains chips, must be filtered before its supply by the hydraulic pump into the hydraulic system of the vehicle. Suction filters are problematic and can not be sufficiently effective because of the pressure drop.

SUMMARY OF THE INVENTION

Accordingly, it is an object of the present invention to provide a container arrangement for a vehicle, which avoids the disadvantages of the prior art.

In keeping with these objects and with others which will become apparent hereinafter, one feature of the present invention resides, briefly stated, in that an additional container is arranged in an oil accommodating means, for example a transmission housing, so that the hydraulic pump aspirates always filtered oil from the additional container to supply into the hydraulic system of the vehicle.

When the container arrangement is designed in accordance with the present invention, the hydraulic pump always supplies only filtered oil into the hydraulic system of the vehicle. The oil which is aspirated by the hydraulic pump can be filtered in an inexpensive return filter which can be designed with a very fine mesh. Thereby the hydraulic system of the vehicle can operate without problems as to its oil supply. Aspiration problems for the hydraulic pump also do not take place.

In accordance with another especially advantageous feature of the present invention, the lubrication pump has a connection to an additional oil container via a filter, and compensates for oil lost to leakage in the hydraulic system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view schematically showing a container arrangement for a vehicle in accordance with the present invention.

DESCRIPTION OF THE PREFERRED EMBODIMENTS

An internal combustion engine of a vehicle is identified in the drawing with reference numeral 10. A transmission housing 11 is mounted on the internal combustion engine 10. A lubricant pump 12 is driven by the internal combustion engine 10 and is located in a lower part of the transmission housing 11.

The lubricant pump 12 aspirates the oil from the sump through a conduit 13. The oil level in the transmission housing is designated in the drawing by a dash-dot line. The lubricant pump is arranged somewhat above the oil level and conveys the oil into a conduit 14 which has a connection to a container 15. The container 15 is arranged in an upper part of the transmission housing 11 above the oil level of the oil sump. A conduit 16 branches from the conduit 14 and serves for lubricating the transmission. A filter 17 or a filter 18 is arranged selectively either in the suction conduit 13 or in the conduit 14.

A hydraulic pump 20 aspirates the oil from the container 15 for supplying a hydraulic system of the vehicle. The oil which flows back from the hydraulic system is returned again into the container 15 through a return conduit 21 and a return filter 22 arranged in the latter. The container 15 is closed advantageously from above for preventing splashing over of the oil.

The oil which is returned through the conduit 21 is filtered by a fine-mesh filter 22, so that the pump 20 always aspirates clean oil and therefore the hydraulic system can operate without problems as to the oil supply. It is important that the pump 20 can aspirate oil from the container 15 without a pre-arranged suction filter, so that also aspiration (suction) problems are avoided. In this manner it is guaranteed that the oil which is supplied from the oil sump into the hydraulic system is not contaminated.

The lubricant pump 12 which is used mainly for lubrication of the transmission compensates for the leakage losses in the hydraulic system since it conveys the oil through the conduit 14 and the filter 18 into the container 15. The lubricant pump 12 is therefore designed somewhat greater.

It will be understood that each of the elements described above, or two or more together, may also find a useful application in other types of constructions differing from the types described above.

While the invention has been illustrated and described as embodied in a container arrangement for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A container arrangement for supplying with oil a hydraulic system and a transmission of a vehicle, the arrangement comprising means containing a supply of oil to be used both for a hydraulic system and a transmission of the vehicle; a lubricant pump for supplying oil to the transmission; a hydraulic pump for supplying oil to the hydraulic system; and an additional container located above an oil level in said means and accommodating filtered oil, said hydraulic pump arranged to aspirate always filtered oil from said additional container for supplying the hydraulic system.

2. A container arrangement as defined in claim 1, wherein said means containing a supply of an oil includes a transmission housing in which the oil is contained.

3. A container arrangement as defined in claim 1; and further comprising a return conduit for returning the oil from the hydraulic system into said additional container; and a filter arranged in said return conduit.

4. A container arrangement as defined in claim 1; and further comprising a conduit which leads from said lubricant pump to said additional container for compensating for leakage losses; and a filter arranged in said conduit leading from said lubricant pump to said additional container.

5. A container arrangement for supplying with oil a hydraulic system and a transmission of a vehicle, the arrangement comprising means containing a supply of oil to be used both for a hydraulic system and a transmission of the housing, said means including a transmission housing having a lower part and an upper part and accommodating oil in an oil sump in said lower part with a predetermined oil level, and an additional container located in said upper part of said transmission housing above said oil level and provided with means for filtering oil; a lubricant pump arranged to aspirate oil from the oil sump in said lower part of said transmission housing and supply oil to the transmission; and a hydraulic pump arranged to aspirate oil which has been filtered, from said additional container and supply the filtered oil from said additional container to the hydraulic system.

* * * * *